(12) United States Patent
Kamble et al.

(10) Patent No.: US 12,526,795 B2
(45) Date of Patent: Jan. 13, 2026

(54) UL GRANT ALLOCATION ON A PRIMARY PATH FOR PRE-SCHEDULING

(71) Applicant: Rakuten Symphony, Inc., Tokyo (JP)

(72) Inventors: Vihang Gangaram Kamble, Surrey (GB); Subramanya Chandrashekar, Indore (IN); Vijayakumar Yalamalli, Bangalore (IN); Praveen Kumar Alur Shivaswamy, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 344 days.

(21) Appl. No.: 18/277,108

(22) PCT Filed: Jun. 30, 2023

(86) PCT No.: PCT/US2023/026713
§ 371 (c)(1),
(2) Date: Aug. 14, 2023

(87) PCT Pub. No.: WO2025/005926
PCT Pub. Date: Jan. 2, 2025

(65) Prior Publication Data
US 2025/0024451 A1    Jan. 16, 2025

(51) Int. Cl.
*H04W 72/12* (2023.01)
*H04W 36/00* (2009.01)
*H04W 36/30* (2009.01)
*H04W 40/36* (2009.01)
*H04W 72/1268* (2023.01)

(52) U.S. Cl.
CPC ....... *H04W 72/1268* (2013.01); *H04W 40/36* (2013.01)

(58) Field of Classification Search
CPC . H04W 72/23; H04W 72/21; H04W 72/0453; H04W 72/0446; H04W 72/51; H04W 74/006; H04W 80/02; H04W 24/08; H04W 72/56; H04W 74/085; H04W 76/15
See application file for complete search history.

(56) References Cited

U.S. PATENT DOCUMENTS

| | | | |
|---|---|---|---|
| 2022/0022228 A1* | 1/2022 | Wang | H04W 88/085 |
| 2024/0064852 A1* | 2/2024 | Wang | H04W 76/22 |
| 2025/0048366 A1* | 2/2025 | Wu | H04W 28/0263 |

(Continued)

*Primary Examiner* — Sai Aung
(74) *Attorney, Agent, or Firm* — Sughrue Mion, PLLC (57) ABSTRACT

A first network node comprises program code including: first receiving code configured to cause at least one of said at least one processor to receive, from a second network node, a UE context modification request; first transmitting code configured to cause at least one of said at least one processor to transmit, to the second network node in response to receiving the context modification request, a context modification response; allocating code configured to cause at least one of said at least one processor to, in response to the UE context modification request, allocate one or more pre-configured grants to the UE, and second receiving code configured to cause at least one of said at least one processor to receive, from the UE in response to the one or more pre-configured grants, first uplink data, before sending a scheduling request to the base station and receiving corresponding UL scheduling grants.

20 Claims, 8 Drawing Sheets

(56) References Cited

U.S. PATENT DOCUMENTS

2025/0142503 A1* 5/2025 Wu .................. H04W 56/0045
2025/0142663 A1* 5/2025 Wu ...................... H04W 76/27
2025/0142664 A1* 5/2025 Wu ...................... H04W 76/27
2025/0142665 A1* 5/2025 Wu ...................... H04W 76/38
2025/0168787 A1* 5/2025 Wu .................. H04W 56/0045

* cited by examiner

UL GRANT ALLOCATION ON A PRIMARY PATH FOR PRE-SCHEDULING

CROSS REFERENCE TO RELATED APPLICATIONS

This application is a National Stage of International Application No. PCT/US2023/026713 filed Jun. 30, 2023.

TECHNICAL FIELD

Apparatuses and methods consistent with example embodiments of the present disclosure relate to UL grant allocation on a primary path for pre-scheduling.

BACKGROUND

Multi-Radio Dual Connectivity (MR-DC) is a generalization of Evolved Universal Terrestrial Radio Access (E-UTRA) Dual Connectivity (DC), where a multiple receiver/transceiver (RX/TX) capable UE may be configured to utilize resources provided by two different nodes connected via a non-ideal backhaul. One of the nodes may provide New Radio (NR) access, and the other of the nodes may provide either Evolved Universal Terrestrial Radio Access (E-UTRA) or NR access. One node may act as a Master Node (MN), and the other node may act as a Secondary Node (SN). The MN and SN are connected via a network interface, where at least one node (e.g., the MN) is connected to a core network (CN).

MR-DC may be connected to the Evolved Packet Core (EPC) or 5G Core (5GC). Based on these connections, there are multiple possible variants including: E-UTRA-NR Dual Connectivity (EN-DC); NG-RAN E-UTRA-NR Dual Connectivity (NGEN-DC), NR-E-UTRA Dual Connectivity (NE-DC), and NR-NR Dual Connectivity (NR-DC). While MR-DC may provide enhanced data capacity, existing MR-DC architectures do not provide primary path configuration information to a gNB-DU, thereby leading to non-optimized packet scheduling.

Improvements are presented herein. These improvements may also be applicable to other multi-Radio Access Technologies (RAT) and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for UL grant allocation on a primary path for pre-scheduling.

According to one or more embodiments, a first network node comprises at least one memory configured to store computer program code; and at least one processor configured to access said at least one memory and operate as instructed by the computer program code. The computer program code includes first receiving code configured to cause at least one of said at least one processor to receive, from a second network node, a F1: UE context modification request or a similar message, associated with a dual connectivity split bearer providing a primary path and a secondary path to the UE, the context modification request including (i) a first parameter indicating the UE requires at least one pre-configured uplink scheduling grant on the primary path, and (ii) a second parameter that includes configuration information regarding the primary path, first transmitting code configured to cause at least one of said at least one processor to transmit, to the second network node in response to receiving the UE context modification request, a context modification response. The computer program code includes allocating code configured to cause at least one of said at least one processor to, in response to the UE context modification request, allocate one or more pre-configured grants to the UE, to be able to transmit UL data on the primary path of the split bearer. The computer program code further includes receiving, from the UE in response to the one or more pre-configured grants, first uplink data on the primary path.

According to one or more embodiments, a method performed by at least one processor in a first network node, the method comprises receiving, from a second network node, a UE context modification request associated with a split bearer providing a primary path and a secondary path to the UE, the context modification request including (i) a first parameter indicating the UE requires at least one pre-configured uplink scheduling grant on the primary path, and (ii) a second parameter that includes configuration information regarding the primary path of the split bearer. The method includes transmitting, to the second network node in response to receiving the context modification request, a context modification response. The method includes in response to the UE context modification request, allocating one or more pre-configured grants to the UE to enable the UE send UL data on the primary path before sending a scheduling request to obtain UL scheduling grants. The method includes receiving, from the UE in response to the one or more pre-configured grants, first uplink data.

According to one or more embodiments, a non-transitory computer readable medium having instructions stored therein, which when executed by a processor in a first network node, cause the processor to receive, from a second network node, a UE context modification request or a similar message associated with a dual connectivity split bearer providing a primary path and a secondary path to the UE, the context modification request including (i) a first parameter indicating the UE requires at least one pre-configured uplink scheduling grant, and (ii) a second parameter that includes configuration information regarding the primary path of the split bearer; transmit, to the second network node in response to receiving the context modification request, a context modification response; in response to the UE context modification request, allocate one or more pre-configured grants to the UE; and receive, from the UE in response to the one or more pre-configured grants, first uplink data before the UE sends a scheduling request to the network node to obtain UL scheduling grants.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Figure 1:
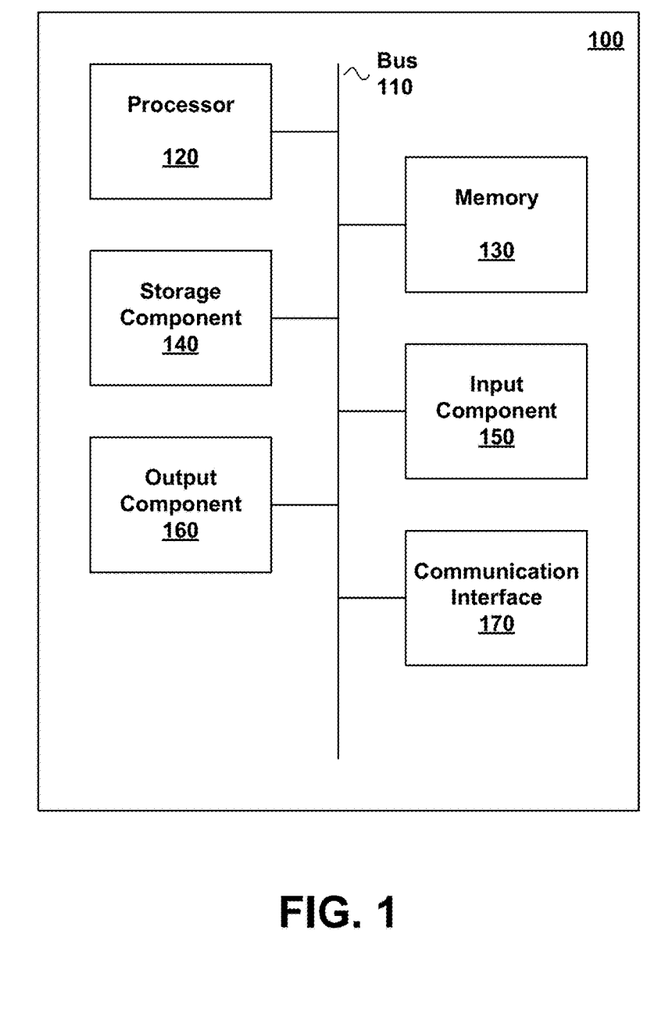
FIG. 1 is a diagram of an example network device in accordance with various embodiments of the present disclosure.

FIG. 1 is a diagram of an example device 100 for implementing the methods of the present disclosure. Device 100 may implement any of the rApps disclosed herein, as well as the O-RAN Ran Intelligent Controller (RIC), and the AI/ML framework. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the O-CU 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
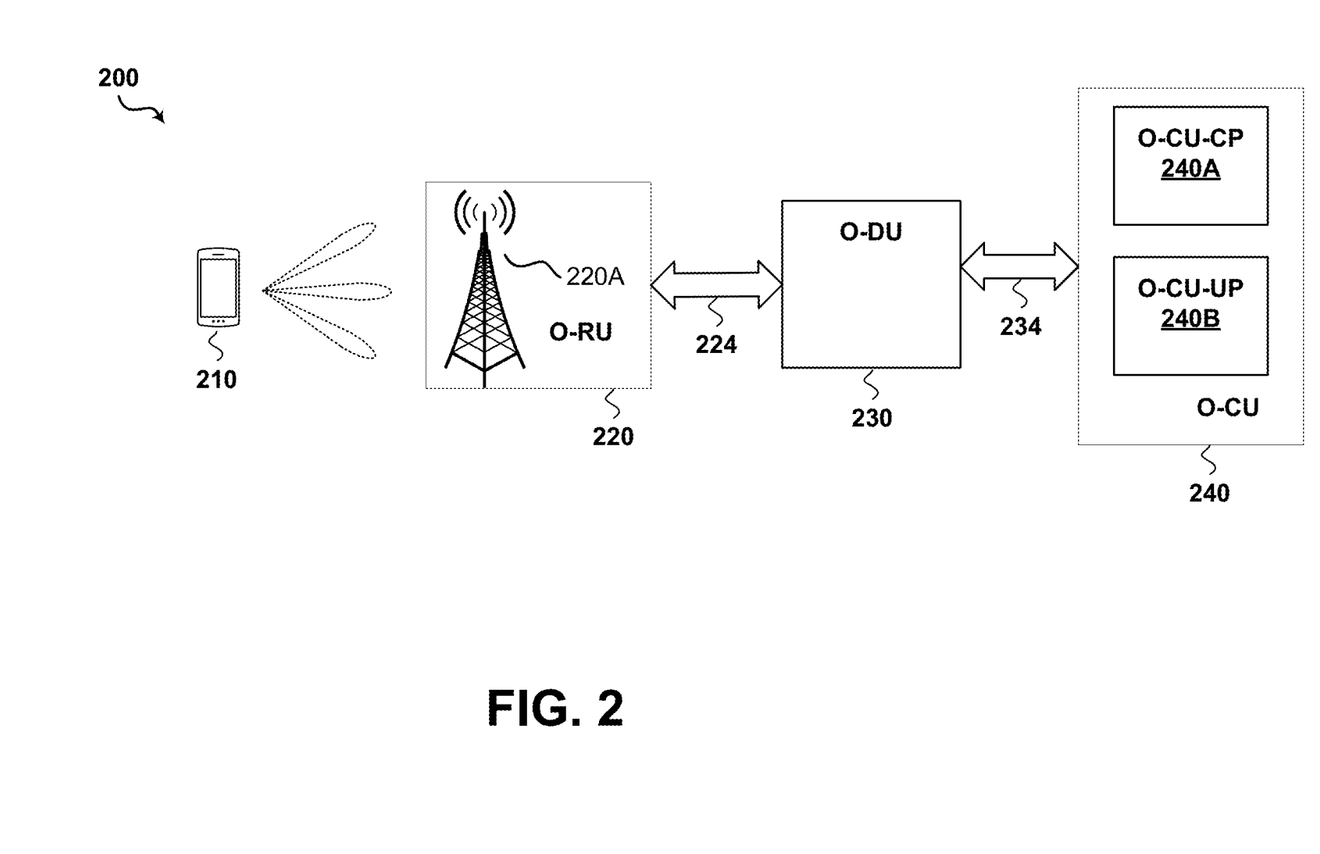
FIG. 2 is a schematic diagram of an example RAN communications system, in accordance with various embodiments of the present disclosure.

FIG. 2 is a diagram illustrating an example RAN communication system 200, according to various embodiments of the present disclosure. The RAN communication system 200 may include one or more user equipment (UE) 210, one or more O-RAN Radio Units (O-RU) 220 that includes one or more antennas 220*a*, one or more O-RAN Distribution Units (O-DU) 230, and one or more O-RAN Centralized Units (O-CU) 240. The base station may be comprised of the O-RU 220, the O-DU 230, and the O-CU 240.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more antennas 220A of the O-RU 220 may wirelessly communicate with the one or more UEs 210. Each base station of the one or more base stations 220A may provide communication coverage to one or more UEs 210 located within a geographic coverage area of that base station 220A. In some embodiments, as shown in FIG. 2, the one or more antennas 220A may transmit one or more beamformed signals to the one or more UEs 210 in one or more transmit directions. The one or more UEs 210 may receive the beamformed signals from the one or more antennas 220A in one or more receive directions. Alternatively or additionally, the one or more UEs 210 may transmit beamformed signals to the base station 220 in one or more transmit directions. The one or more antennas 220A may receive the beamformed signals from the one or more UEs 210 in one or more receive directions.

The one or more antennas 220A may include macrocells (e.g., high power cellular base stations) and/or small cells (e.g., low power cellular base stations). The small cells may include femtocells, picocells, and microcells. The one or more antennas 220A, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

In some embodiments, the O-RU 220 may be connected to the O-DU 230 via a front-haul (FH) link 224. The FH link 224 may be a 25 Gbps line in which User Plane (U-plane) and Control Plane (C-Plane) packets are downloaded from the O-DU 230 to the O-RU 220. In some embodiments, the O-DU 230 may be connected to the O-CU 240 via a midhaul link 234. The O-CU 240 may include an O-CU Control Plane (O-CU-CP) packet generator 240A and an O-CU User Plane (O-CU-UP) packet generator 240B. C-plane and U-plane packets may originate from the O-CU-CP packet generator 240A and the O-CU-UP packet generator 240B, respectively.

Figure 3:
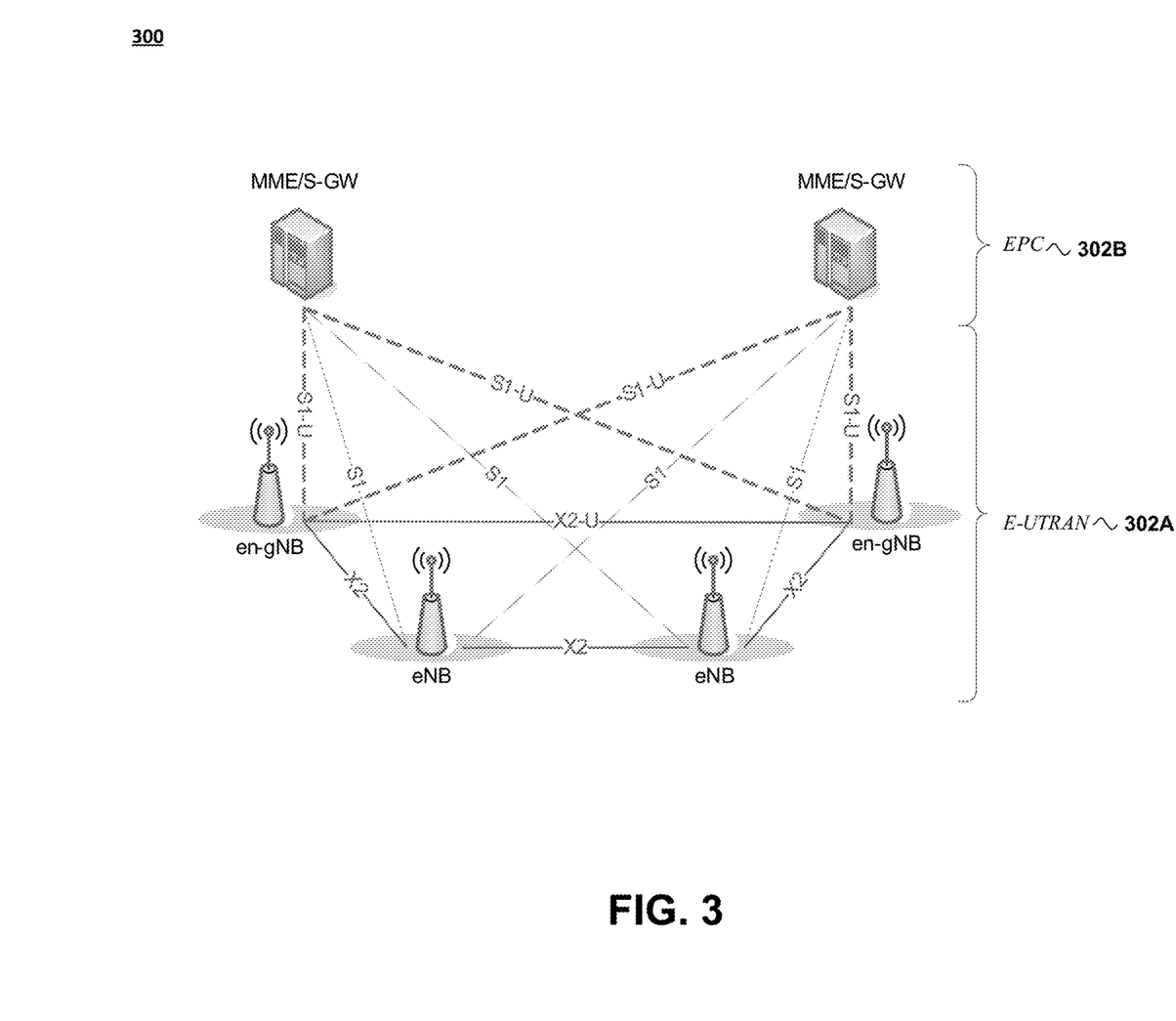
FIG. 3 illustrates an example architecture of an EN-DC variant of MR-DC, in accordance with various embodiments of the present disclosure.

FIG. 3 illustrates an example architecture 300 of an EN-DC variant of MR-DC. As illustrated in FIG. 3, the E-UTRAN is connected to the EPC.

Figure 4A:
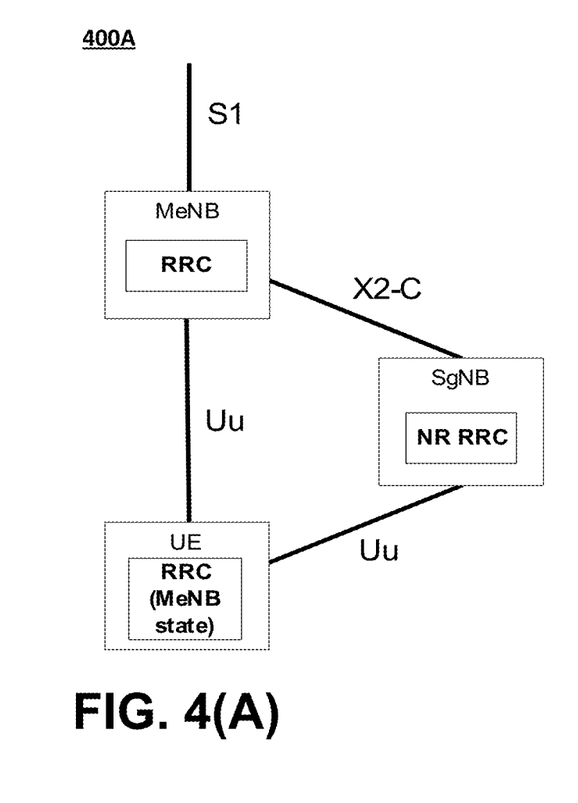
FIG. 4(A) illustrates an example control plane architecture for EN-DC, in accordance with various embodiments of the present disclosure.
Figure 4B:
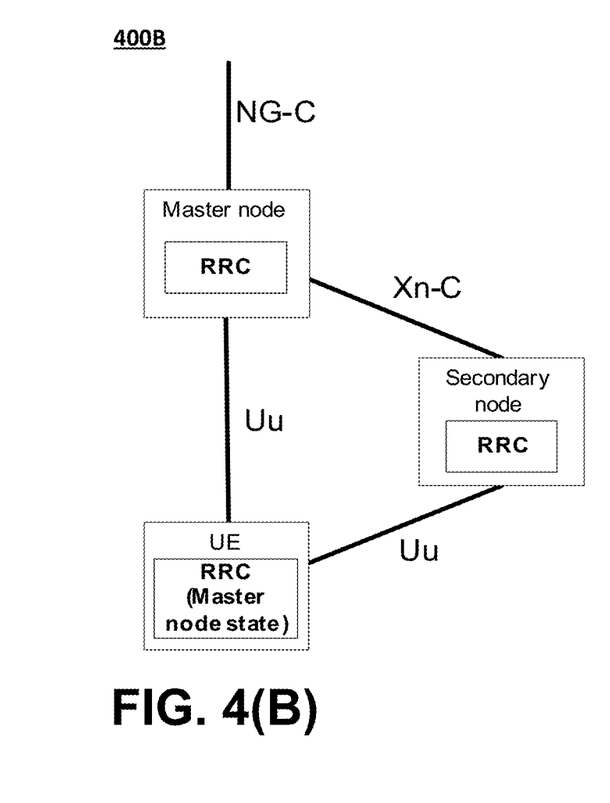
FIG. 4(B) illustrates an example control plane architecture for MR-DC with 5GC, in accordance with various embodiments of the present disclosure.

FIG. 4(A) illustrates an example control plane architecture 400A for an EN-DC in which a UE is connected to a master eNodeb (MeNB) and a secondary gNB (SgNB) via respective Uu interfaces, the MeNB and SgNB are connected via a X2-C interface, and the MeNB is connected to a core network via a S1 interface. FIG. 4(B) illustrates an example control plane architecture 400B for a MR-DC in which a UE is connected with a master node (MN) and a secondary node (SN) via respective Uu interfaces, the MN and the SN are connected via Xn-C interface, and the master node is connected to a 5G core network via a next generation control plane (NG-C) interface.

Figure 5A:
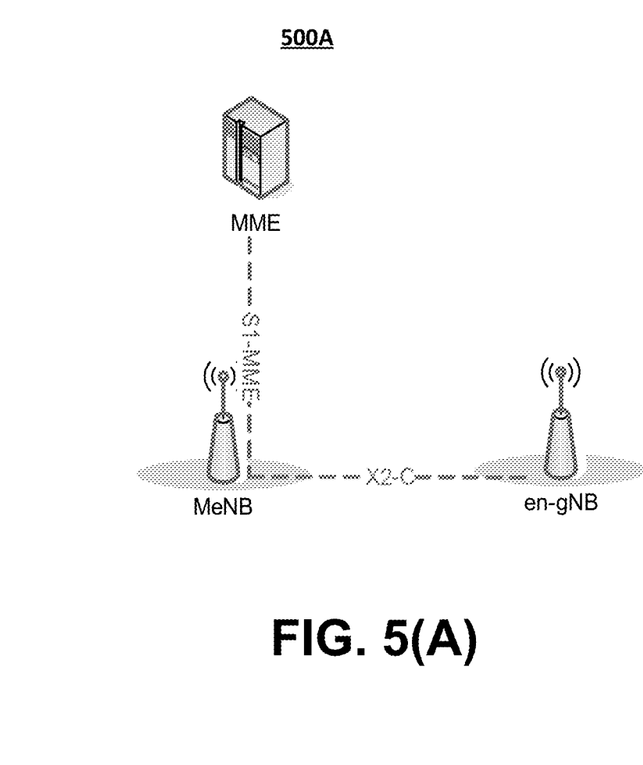
FIG. 5(A) illustrates an example C-plane architecture for EN-DC, in accordance with various embodiments of the present disclosure.
Figure 5B:
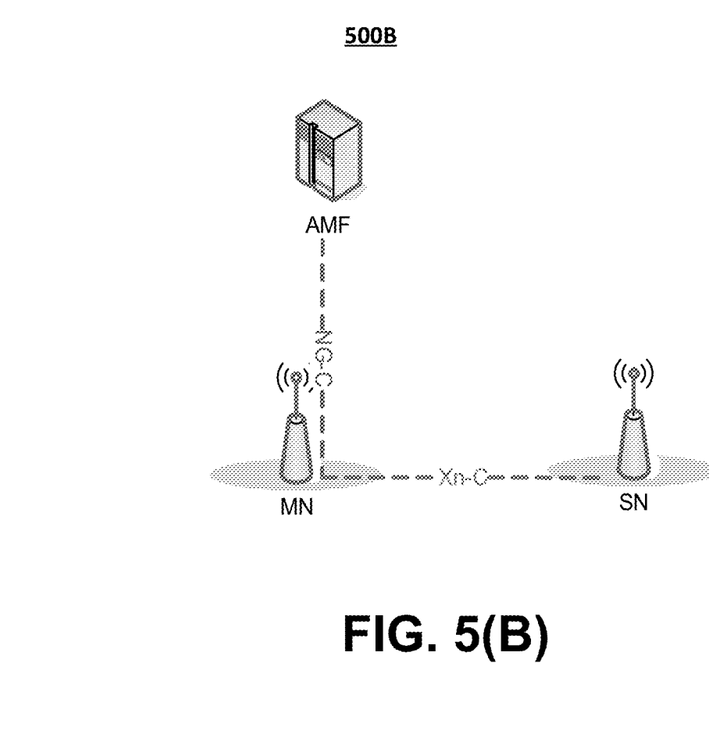
FIG. 5(B) illustrates an example C-plane architecture for MR-DC with 5GC, in accordance with various embodiments of the present disclosure.

FIG. 5(A) illustrates an example C-plane architecture 500A for EN-DC in which a MeNB is connected to an en-gNB via a X2-C interface, and the MeNB is connected to an MME via a 51-MME interface. FIG. 5(B) illustrates an example C-plane architecture 500B in which a MN is connected to a SN via a Xn-C interface, and the MN is connected to an access and mobility management function (AMF) via a NG-C interface.

Figure 6A:
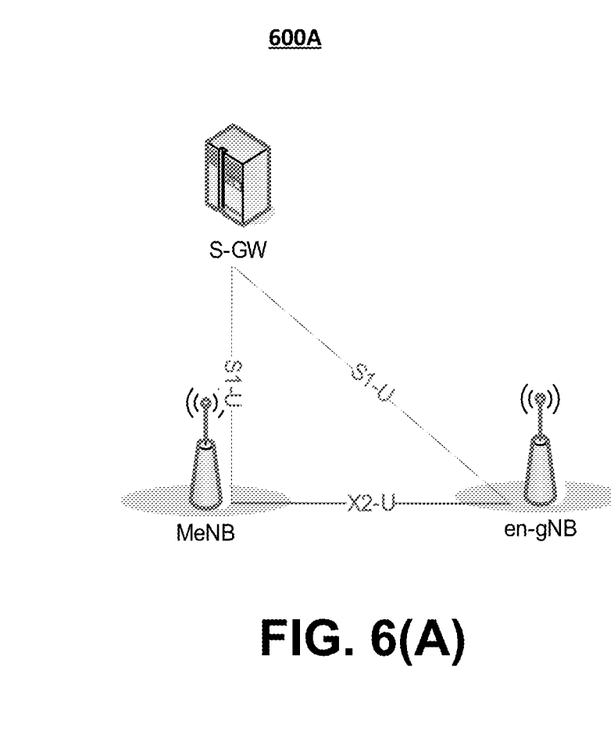
FIG. 6(A) illustrates an example U-plane architecture for EN-DC, in accordance with various embodiments of the present disclosure.
Figure 6B:
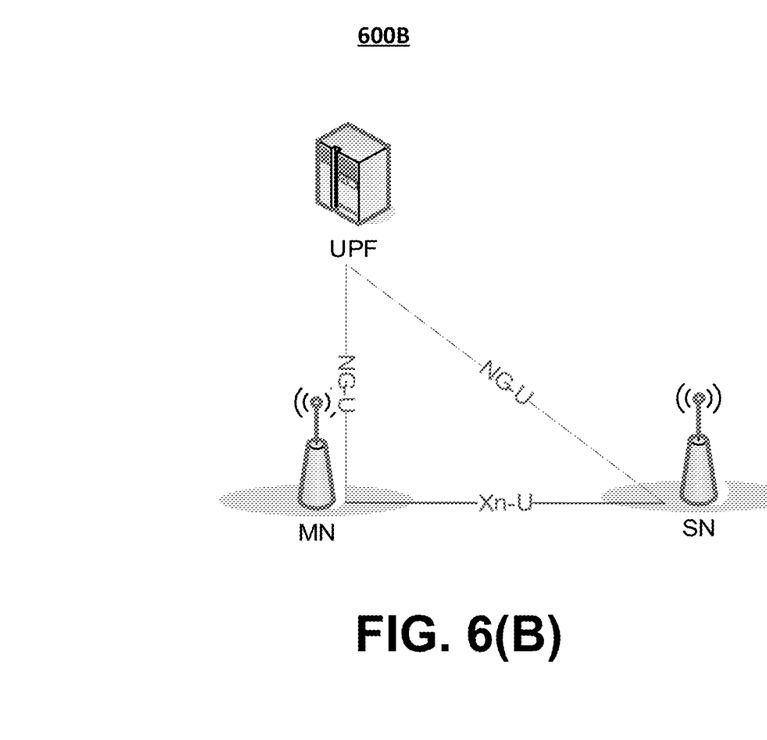
FIG. 6(B) illustrates an example U-plane architecture for MR-DC with 5GC, in accordance with various embodiments of the present disclosure.

FIG. 6(A) illustrates an example U-Plane architecture 600A for EN-DC in which a MeNB is connected with an en-gNB via a X2-U interface, and the MeNB and the en-gNB are connected with a S-GW via respective S1-U interfaces. FIG. 6(B) illustrates an example U-Plane architecture 600B for MR-DC with 5GC in which a MN is connected with a SN via a Xn-U interface, and a user plane function (UPF) is connected with the MN and the SN via respective NG-U interfaces.

Dual connectivity may be configured to have a packet data convergence protocol (PDCP) entity associated with more than one RLC entity (e.g., split bearer case). In this type of configuration, there is a primary radio link control (RLC) path and a secondary RLC path. However, currently, a primary path setting for a signaling radio bearer (SRB) is always set to the MCG cell group ID, whereas for a data radio bearer (DRB), the primary path setting may be either the master cell group (MCG) or the secondary cell group (SCG) cell group ID.

While the NR-DC variant of MR-DC is utilized to illustrate the following problems, these problems also exist for other variants of the MR-DC. A MAC-PS (Packet Scheduler) is a layer 2 RRM algorithm and is vendor proprietary in nature. Certain optimizations to the MAC-PS may be performed by a gNB-DU to serve the UE better. For example, a UE may be enabled to send UL data faster. Before a UE can send uplink data, the UE needs UL scheduling grants. The scheduling grants may be requested by the UE by sending a scheduling request to the gNB-DU, where the grant is subsequently allocated.

In order to support MAC-PS scheduler optimization, the gNB-DU needs to be aware of primary path configuration information of the UE's split bearer. However, currently, gNB-DU does not have any information about the primary path configuration because over the current F1-C interface, there is no provision to share primary path configuration information for a UE. When the UE has small amounts of data or until a certain data rate threshold is crossed, it is preferred to use the primary path (e.g., generally, path associated with MN) since there are additional delays with the secondary path (e.g., path associated with SN). A UE may have multiple split-bearers (e.g., DC configured), and therefore, there is a need to identify which split-bearer needs scheduler optimization.

Embodiments of the present disclosure are directed to providing primary path configuration between two nodes, eg: a gNB-CU and a gNB-DU, where pre-configured grants may be allocated to a UE's primary path accordingly. In this regard, a UE context modification request sent from a gNB-CU to a gNB-DU may include (i) a parameter indicating that a UE having a split-bearer required scheduled grants for uplink data, and (ii) a parameter providing primary path configuration information for the split-bearer. The primary path configuration information may indicate the primary path.

According to one or more embodiments, whenever a UE is configured with any variant of MR-DC, the primary path configuration information from gNB-CU to gNB-DU is included over the F1-C interface in the F1: UE Context Setup/Modification procedure. The primary path configuration information may be kept optional and per DRB. Therefore, the presence of this primary path information for a split-bearer over F1-C may indicate the scheduling optimization requirement from the CU.

According to one or embodiments, the primary path information shared by the gNB-CU may be utilized by the gNB-DU to ensure advance UL scheduling grants are allocated to the UE (e.g., pre-configured grants) in each cell in a RRC_Connected state to enable faster UL data transmission. The UE may use the pre-configured grants to send UL data before sending a scheduling request to gNB-DU. The embodiments of the present disclosure result in the significantly advantageous feature of faster UL data transmission on the primary path of the UE.

Figure 7:
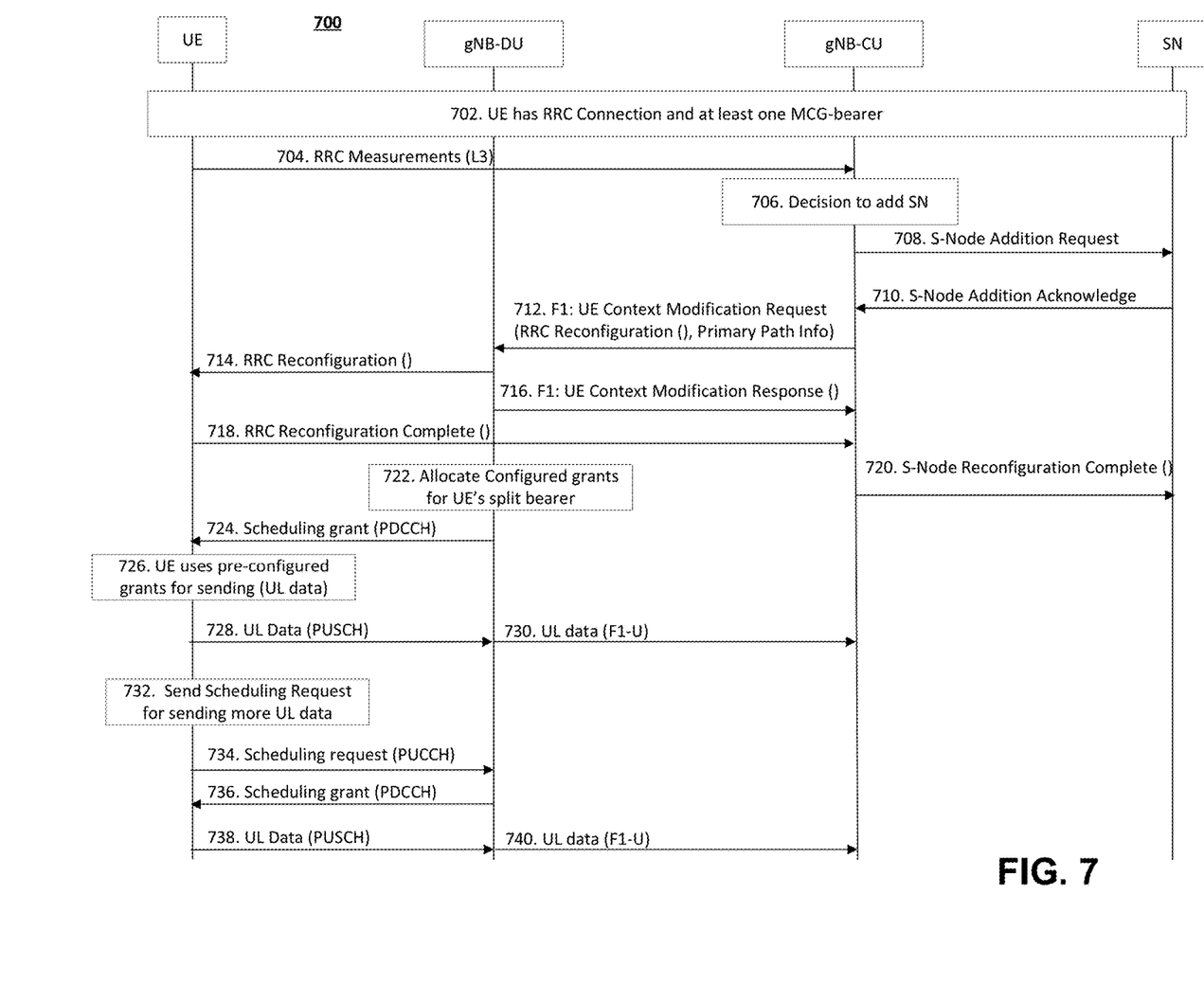
FIG. 7 illustrates an example signaling diagram of a process for UL grant allocation based on primary path configuration information, in accordance with various embodiments of the present disclosure.

FIG. 7 illustrates an example signaling diagram of a process 700 for UL grant allocation based on primary path configuration information, in accordance with various embodiments of the present disclosure. While the process 700 is implemented for the NR-DC variant, as understood by one of ordinary skill in the art, the process 700 may be implemented for all other MR-DC variants. For example, the embodiments of the present disclosure, including the process 700, are also applicable to other DC variants apart from NR-DC where the MN role could be assumed by the same or another gNB-CU that is controlling the SN.

In operation 702, a UE has a RRC connection and at least one MCG-bearer.

In operation 704, RRC measurements (L3) are performed between the UE and the gNB-CU.

In operation 706, the gNB-CU makes a decision to add a SN.

In operation 708, the gNB-CU sends a S-Node addition request to the SN. In operation 710, the gNB-CU receives a S-Node addition acknowledge from the SN.

In operation 712, the gNB-CU sends a context modification request or a similar message to the gNB-DU. The context modification request may be a F1: UE context modification request that is provided over the F1 interface. The context modification request may include RRC reconfiguration ( ) message as payload, to be sent to the UE. The context modification request may further include primary path configuration information for consumption at the gNB-DU. The context modification request may further include a parameter indicating that the UE requires pre-configured scheduling grants to transmit uplink data before sending a scheduling request. Furthermore, the primary path configuration may be indicated per-split bearer configured for the UE. For example, if the UE has a plurality of split bearers, the primary path configuration may be indicated for one or more of the plurality of split bearers for which the UE requires pre-configured scheduled grants. If the UE does not have a split bearer for which the UE requires scheduled grants, the remaining operations in FIG. 7 (e.g., operations 714-740) may be skipped.

In operation 714, the gNB-DU sends a RRC reconfiguration ( ) message to the UE.

In operation 716, the gNB-DU sends a context modification response to the gNB-CU. The context modification response may be provided over the F1 interface.

In operation 718, the UE sends a RRC reconfiguration complete ( ) message to the gNB-CU.

In operation 720, the gNB-CU sends a S-Node reconfiguration complete (message to the SN.

In operation 722, the gNB-DU allocates pre-configured grants for the split bearer of the UE. The grants allocated in operation 722 may be pre-configured grants that are separate from grants resulting from the UE requesting scheduled grants.

In operation 724, the gNB-DU sends a scheduling grant to the UE over the physical downlink control channel (PDCCH). The scheduling grant may provide the pre-configured grants allocated in operation 722. The scheduling grant may be sent over the PDCCH. This may be provided whenever the UE establishes a split bearer or when UE undergoes a serving cell change.

In operation 726, the UE uses the pre-configured grants for sending uplink data. In operation 728, the UE transmits uplink data to the gNB-DU. The uplink data may be sent over the physical uplink shared channel (PUSCH). In operation 730, the gNB-DU transmits the received uplink data to the gNB-CU over the F1 interface.

In operation 732, the UE may require scheduled grants for sending additional uplink data. In operation 734, the UE sends a scheduling request to the gNB-DU. The scheduling request may be sent over the physical uplink control channel (PUCCH). In operation 736, the gNB-DU sends a scheduling grant over the PDCCH. Compared to operation 724, which is performed without receiving a scheduling request, operation 736 may be performed in response to receiving the scheduling request from the UE. In operation 738, the UE transmits additional uplink data over the PUSCH to the gNB-DU. In operation 740, the gNB-DU transmits the received UL data to the gNB-CU over the F1 interface.

According to one or more embodiments, to address the handover use-case, the primary path configuration information may also be included in a Xn: Handover request message from the source MN to the target MN. Including the primary path configuration information in a handover request ensures that the pre-configured grant allocation to the UE may be performed even after inter-MN HO, i.e., at the new serving MN.

According to one or more embodiments, the pre-configured grant may be valid (e.g., applicable) only in a current serving cell of the UE. Therefore, in one or more embodiments, a pre-configured grant may be allocated to a serving cell when the UE performs change or HO to a new serving cell (e.g., the pre-configured grant is allocated to the UE during all intra gNB-DU or inter gNB-DU or inter MN HO). The validity of the pre-configured grant in the serving cell may also be signaled to the UE.

Subsequently, if there is UE mobility and the UE changes its MN, the new target MN may also need this information, where the new target gNB-DU is configured with the primary path info (e.g., primary path info may be used for allocating pre-configured grant at the new MN). Therefore, in one or more embodiments, the primary path configuration information may be included in the MN-MN interface. The MN-MN interface may be X2 or Xn.

According to the embodiments of the present disclosure, the primary path configuration information may be available over (i) the F1-C interface between the gNB-CU and gNB- DU, (ii) the Xn-C interface between the MN and SN or between the MN and MN, or (iii) X2-C between the MN and SN or between the MN and MN.

Figure 8:
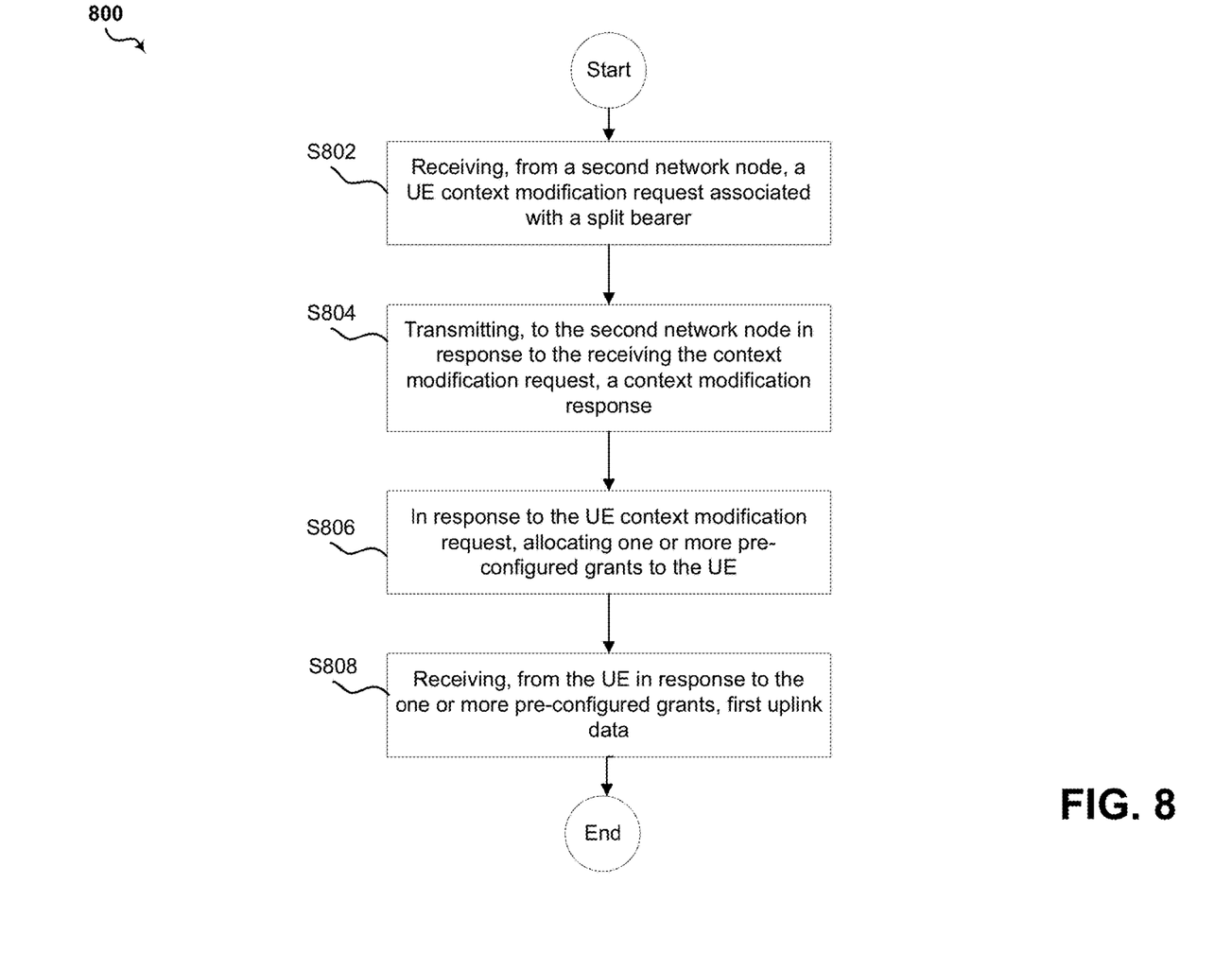
FIG. 8 illustrates a flowchart of an embodiment of a process for UL grant allocation based on primary path configuration information, in accordance with various embodiments of the present disclosure.

FIG. 8 illustrates a flowchart of an embodiment of a process 800 for UL grant allocation based on primary path configuration information, in accordance with various embodiments of the present disclosure. The process 800 may be performed by a first network node such as the gNB-DU.

The process may start at operation S802 where the first network node receives, from a second network node, a UE context modification request associated with a split bearer. The UE context modification request may correspond to the UE context modification request in operation 712, which may include a parameter indicating that the UE requires a scheduled grant, and a parameter providing primary path configuration information.

The process proceeds to operation S804 where the first network node transmits, to a second network node in response to receiving the context modification request, a context modification response. The context modification response may correspond to the response in operation 716.

The process proceeds to operation S806, where in response to the context modification request, the first network node allocates one or more pre-configured grants to the UE. This allocation of pre-configured grants may include operations 722 and 724.

The process proceeds to operation S808 where the first network node receives, from the UE in response to the one or more pre-configured grants, first uplink data. This uplink data may be received in accordance with operations 726 and 728. The first uplink data may correspond to a data transmission that is different from uplink data transmitted based on a request for a scheduled grant from the UE such as the uplink data transmitted in operation 738.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A first network node comprising: at least one memory configured to store computer program code; and at least one processor configured to access said at least one memory and operate as instructed by the computer program code, the computer program code comprising: first receiving code configured to cause at least one of said at least one processor to receive, from a second network node of a base station, a UE context modification request associated with a split bearer providing a primary path and a secondary path to the UE, the context modification request comprising (i) a first parameter indicating the UE requires at least one pre-configured uplink scheduling grant, and (ii) a second parameter that comprises configuration information regarding the primary path, first transmitting code configured to cause at least one of said at least one processor to transmit, to the second network node of the base station, in response to receiving the context modification request, a context modification response, allocating code configured to cause at least one of said at least one processor to, in response to the UE context modification request, allocate one or more pre-configured grants to the UE, and second receiving code configured to cause at least one of said at least one processor to receive, from the UE in response to the one or more pre-configured grants, first uplink data, before sending a scheduling request to the base station and receiving corresponding UL scheduling grants.

(2) The first network node of the base station according to feature (1), in which the computer program code further comprises: second transmitting code configured to cause at least one of said at least one processor to transmit, to the second network node, the first uplink data.

(3) The first network node of the base station, according to feature (1) or (2), in which the computer program code further comprises: third receiving code configured to cause at least one of said at least one processor to, after allocating the one or more pre-configured grants to the UE, receive from the UE, a request for additional UL scheduling grants, second transmitting code configured to cause at least one of said at least one processor to, in response to receiving the request for the additional UL scheduling grants, transmit to the UE, one or more additional UL scheduled grants, and fourth receiving code configured to cause at least one of said at least one processor to, in response to the one or more additional UL scheduled grants, receive from the UE, second uplink data.

(4) The first network node of the base station according to any one of features (1)-(3), in which the UE context modification request is received over an F1 interface, and the UE context modification response is transmitted over the F1 interface.

(5) The first network node of the base station according to any one of features (1)-(4), in which the first network node is a distributed unit (gNB-DU) and the second network node is a central unit (gNB-CU).

(6) The first network node of the base station according to any one of features (1)-(5), in which the second network node is a master node in communication with a secondary node.

(7) The first network of the base station according to any one of features (1)-(6), in which the computer program code comprises: second transmitting code configured to cause at least one of said at least one processor to, in response to the UE undergoing handover from a serving cell to a target cell, transmit the primary path configuration information to a target node in the target cell that allocates grants to the UE.

(8) The first network node of the base station of feature (7), in which the computer program code comprises: third transmitting code configured to cause at least one of said at least one processor to, in response to the UE undergoing handover from the serving cell to the target cell, transmitting a message to the UE indicating that the one or more pre-configured grants are allocated and valid in the target cell.

(9) A method performed by at least one processor in a first network node, the method comprising: receiving, from a second network node, a UE context modification request associated with a split bearer providing a primary path and a secondary path to the UE, the context modification request comprising (i) a first parameter indicating the UE requires at least one pre-configured uplink scheduling grant, and (ii) a second parameter that comprises configuration information regarding the primary path of the split bearer; transmitting, to the second network node in response to receiving the context modification request, a context modification response; in response to the UE context modification request, allocating one or more pre-configured grants to the UE; and receiving, from the UE in response to the one or more pre-configured grants, first uplink data before receiving a scheduling request at the first network node requesting additional UL scheduling grants and sending corresponding additional UL scheduled grants.

(10) The method according to feature (9), further comprising: transmitting, to the second network node, the first uplink data.

(11) The method according to feature (9) or (10), further comprising: after allocating the one or more pre-configured grants to the UE, receiving from the UE, a request for the additional UL scheduling grants; in response to receiving the request for the additional UL scheduling grants, transmitting to the UE, one or more additional UL scheduled grants; and in response to the one or more additional UL scheduled grants, receiving from the UE, second uplink data.

(12) The method according to any one of features (9)-(11), in which the UE context modification request is received over an F1 interface, and the UE context modification response is transmitted over the F1 interface.

(13) The method according to any one of features (9)-(13), in which the first network node is a distributed unit (gNB-DU) and the second network node is a central unit (gNB-CU).

(14) The method according to any one of features (9)-(13), in which the second network node is a master node in communication with a secondary node.

(15) The method according to any one of features (9)-(13), further comprising: in response to the UE undergoing handover from a serving cell to a target cell, transmitting the primary path configuration information from the source node to a target node in the target cell that allocates grants to the UE.

(16) The method of feature (15), in which primary path configuration information is transferred (i) from the source node to the target node over the Xn interface in case of an inter gNB handover and (ii) from the source node to the target node over the F1 interface in case of an intra gNB handover.

(17) The method of feature (15) or (16), further comprising: in response to the UE undergoing handover from the serving cell to the target cell, transmitting a message to the UE indicating that the one or more pre-configured grants are allocated and valid in the target cell.

(18) A non-transitory computer readable medium having instructions stored therein, which when executed by a processor in a first network node cause the processor to: receive, from a second network node, a UE context modification request associated with a split bearer providing a primary path and a secondary path to the UE, the context modification request comprising (i) a first parameter indicating the UE requires at least one uplink scheduling grant, and (ii) a second parameter that comprises configuration information regarding the primary path; transmit, to the second network node in response to receiving the context modification request, a context modification response; in response to the UE context modification request, allocate one or more pre-configured grants to the UE; and receive, from the UE in response to the one or more pre-configured grants, first uplink data, before sending a scheduling request to the base station and receiving corresponding UL scheduling grants.

(19) The non-transitory computer readable medium according to feature (17) or (18), further comprising: transmitting, to the second network node, the first uplink data.

(20) The non-transitory computer readable medium according to any one of features (17)-(19), further comprising: after allocating the one or more pre-configured grants to the UE, receiving from the UE, a request for additional UL scheduling grants; in response to receiving the request for the additional UL scheduling grants, transmitting to the UE, one or more additional UL scheduled grants; and in response to the one or more scheduled grants, receiving from the UE, second uplink data.

What is claimed is:

1. A first network node comprising:
   at least one memory configured to store computer program code; and
   at least one processor configured to access said at least one memory and operate as instructed by the computer program code, the computer program code comprising:
      first receiving code configured to cause at least one of said at least one processor to receive, from a second network node of a base station, a UE context modification request associated with a split bearer providing a primary path and a secondary path to the UE, the context modification request comprising (i) a first parameter indicating the UE requires at least one pre-configured uplink scheduling grant, and (ii) a second parameter that comprises configuration information regarding the primary path,
      first transmitting code configured to cause at least one of said at least one processor to transmit, to the second network node of the base station, in response to receiving the context modification request, a context modification response,
      allocating code configured to cause at least one of said at least one processor to, in response to the UE context modification request, allocate one or more pre-configured grants to the UE, and
      second receiving code configured to cause at least one of said at least one processor to receive, from the UE in response to the one or more pre-configured grants, first uplink data, before sending a scheduling request to the base station and receiving corresponding UL scheduling grants.

2. The first network node of the base station according to claim 1, wherein the computer program code further comprises:
   second transmitting code configured to cause at least one of said at least one processor to transmit, to the second network node, the first uplink data.

3. The first network node of the base station, according to claim 1, wherein the computer program code further comprises:

third receiving code configured to cause at least one of said at least one processor to, after allocating the one or more pre-configured grants to the UE, receive from the UE, a request for additional UL scheduling grants, second transmitting code configured to cause at least one of said at least one processor to, in response to receiving the request for the additional UL scheduling grants, transmit to the UE, one or more additional UL scheduled grants, and fourth receiving code configured to cause at least one of said at least one processor to, in response to the one or more additional UL scheduled grants, receive from the UE, second uplink data.

4. The first network node of the base station according to claim 1, wherein the UE context modification request is received over an F1 interface, and the UE context modification response is transmitted over the F1 interface.

5. The first network node of the base station of claim 1, wherein the first network node is a distributed unit (gNB-DU) and the second network node is a central unit (gNB-CU).

6. The first network node of the base station of claim 1, wherein the second network node is a master node in communication with a secondary node.

7. The first network of the base station of claim 1, wherein the computer program code comprises:

second transmitting code configured to cause at least one of said at least one processor to, in response to the UE undergoing handover from a serving cell to a target cell, transmit the primary path configuration information to a target node in the target cell that allocates grants to the UE.

8. The first network node of the base station of claim 7, wherein the computer program code comprises:

third transmitting code configured to cause at least one of said at least one processor to, in response to the UE undergoing handover from the serving cell to the target cell, transmitting a message to the UE indicating that the one or more pre-configured grants are allocated and valid in the target cell.

9. A method performed by at least one processor in a first network node, the method comprising:

receiving, from a second network node, a UE context modification request associated with a split bearer providing a primary path and a secondary path to the UE, the context modification request comprising (i) a first parameter indicating the UE requires at least one pre-configured uplink scheduling grant, and (ii) a second parameter that comprises configuration information regarding the primary path of the split bearer;

transmitting, to the second network node in response to receiving the context modification request, a context modification response;

in response to the UE context modification request, allocating one or more pre-configured grants to the UE; and receiving, from the UE in response to the one or more pre-configured grants, first uplink data before receiving a scheduling request at the first network node requesting additional UL scheduling grants and sending corresponding additional UL scheduled grants.

10. The method according to claim 9, further comprising: transmitting, to the second network node, the first uplink data.

11. The method according to claim 9, further comprising: after allocating the one or more pre-configured grants to the UE, receiving from the UE, a request for the additional UL scheduling grants;

in response to receiving the request for the additional UL scheduling grants, transmitting to the UE, one or more additional UL scheduled grants; and in response to the one or more additional UL scheduled grants, receiving from the UE, second uplink data.

12. The method according to claim 9, wherein the UE context modification request is received over an F1 interface, and the UE context modification response is transmitted over the F1 interface.

13. The method of claim 9, wherein the first network node is a distributed unit (gNB-DU) and the second network node is a central unit (gNB-CU).

14. The method of claim 9, wherein the second network node is a master node in communication with a secondary node.

15. The method of claim 9, further comprising:

in response to the UE undergoing handover from a serving cell to a target cell, transmitting the primary path configuration information from the source node to a target node in the target cell that allocates grants to the UE.

16. The method of claim 15, wherein primary path configuration information is transferred (i) from the source node to the target node over the Xn interface in case of an inter gNB handover and (ii) from the source node to the target node over the F1 interface in case of an intra gNB handover.

17. The method of claim 15, further comprising:

in response to the UE undergoing handover from the serving cell to the target cell, transmitting a message to the UE indicating that the one or more pre-configured grants are allocated and valid in the target cell.

18. A non-transitory computer readable medium having instructions stored therein, which when executed by a processor in a first network node cause the processor to:

receive, from a second network node, a UE context modification request associated with a split bearer providing a primary path and a secondary path to the UE, the context modification request comprising (i) a first parameter indicating the UE requires at least one uplink scheduling grant, and (ii) a second parameter that comprises configuration information regarding the primary path;

transmit, to the second network node in response to receiving the context modification request, a context modification response;

in response to the UE context modification request, allocate one or more pre-configured grants to the UE; and receive, from the UE in response to the one or more pre-configured grants, first uplink data, before sending a scheduling request to the base station and receiving corresponding UL scheduling grants.

19. The non-transitory computer readable medium according to claim 17, further comprising:

transmitting, to the second network node, the first uplink data.

20. The non-transitory computer readable medium according to claim 17, further comprising:

after allocating the one or more pre-configured grants to the UE, receiving from the UE, a request for additional UL scheduling grants;

in response to receiving the request for the additional UL scheduling grants, transmitting to the UE, one or more additional UL scheduled grants; and in response to the one or more scheduled grants, receiving from the UE, second uplink data.

* * * * *